Sept. 28, 1965

R. AJA 3,208,487

BAND SAWS FOR CUTTING MEAT AND BONE AND MEANS
TO CLEAN SUCH SAWS

Filed Dec. 3, 1963

INVENTOR.
RUDOLPH AJA

BY
Felshin and Rosen
ATTORNEYS.

3,208,487
BAND SAWS FOR CUTTING MEAT AND BONE
AND MEANS TO CLEAN SUCH SAWS
Rudolph Aja, 875 Amsterdam Ave., New York, N.Y.
Filed Dec. 3, 1963, Ser. No. 327,629
8 Claims. (Cl. 143—158)

This invention relates to band saws and, more particularly, to such saws for cutting meat and bone.

An object of the invention is to provide an improved band saw, especially useful for cutting meat and bone, and improved means for removing fat and bone-dust therefrom during the operation of the band saw.

A further object is to provide a band saw of the indicated type with longitudinal grooves along the sides of the band saw for catching fat and bone-dust and scraper means operable in said grooves for removing said fat and bone-dust.

Another object is generally to provide an improved band saw and improved scraper means therefor.

The above and other objects, features and advantages of this invention will be more fully understood from the following description of the invention considered in connection with the accompanying illustrative drawing of a presently preferred embodiment of the invention, in which.

Figure 1:
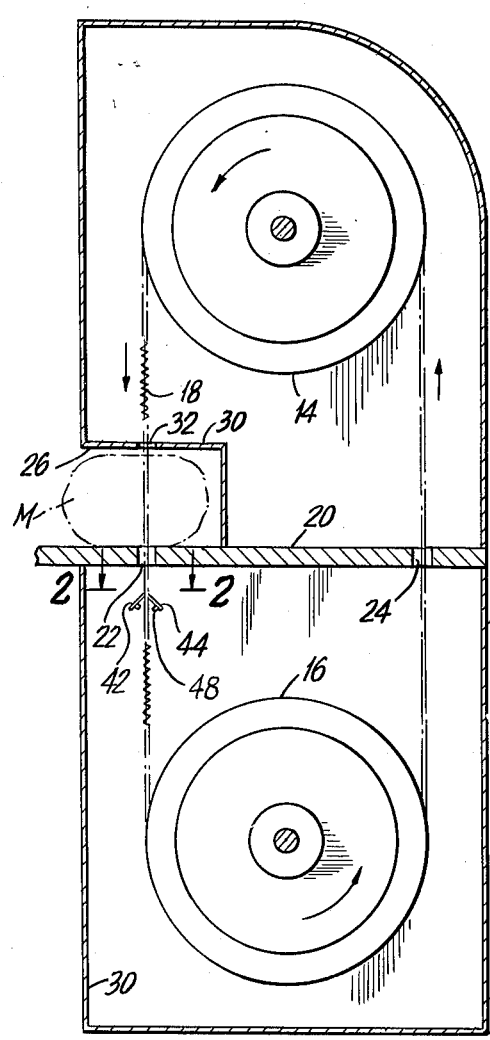
FIG. 1 is a vertical sectional view of a band saw device embodying the present invention.

Referring now to the drawing in detail, band saw device 10 comprises a housing 12 supporting upper and lower pulley wheels 14 and 16, respectively, on which an endless band saw blade 18 is mounted in the usual fashion. Pulley wheel 14 is operated by a motor, not shown, and drives the band saw blade in the directions indicated. Housing 12 is provided with a platform 20 which has openings 22 and 24 through which the blade passes. The band saw blade is encased within the housing except at the housing cut-away portion 26 so that the band saw blade teeth 28 can engage the meat M for cutting the latter. Wall 30 is provided with opening 32 through which the blade can pass and the meat is supported on the forward part of platform 20. Openings 32 and 22 are in vertical alignment.

Figure 2:
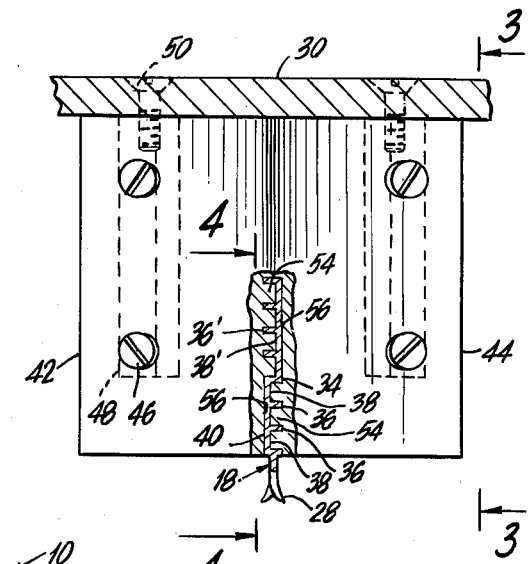
FIG. 2 is a horizontal sectional view, on a larger scale, taken on line 2—2 of FIG. 1.

Band saw blade 18 is an endless flexible band made of steel or any other suitable saw blade material. Teeth 28 are of the usual type and extend along one edge of the blade with adjacent teeth extending toward opposite sides of the saw blade in the usual fashion and as best seen in FIG. 2. One side 34 of the blade is provided with a series of longitudinally extending, spaced, parallel ridges 36 which form longitudinally extending, spaced, parallel grooves 38. The opposite side 40 of the blade is flat. Grooves 38 are spaced slightly rearwardly of teeth 28.

Another series of longitudinally extending, spaced, parallel ridges 36', which form longitudinally extending, spaced, parallel grooves 38', are formed at side 40 of the blade, inwardly from the first mentioned ridges 36 and grooves 38. The side 34 of the blade, opposite ridges 36' and grooves 38', is flat. In other words, one side of the blade is formed with a portion having spaced grooves and another portion which is flat, while the other side of the blade is formed with a portion which is flat and opposite the grooved portion on the first mentioned side of the blade, and with another portion which is grooved and opposite the flat portion on the first mentioned side of the blade. It is to be understood that the blade is a unitary member having the grooves formed in its opposite sides and extending longitudinally of the blade.

Figure 3:
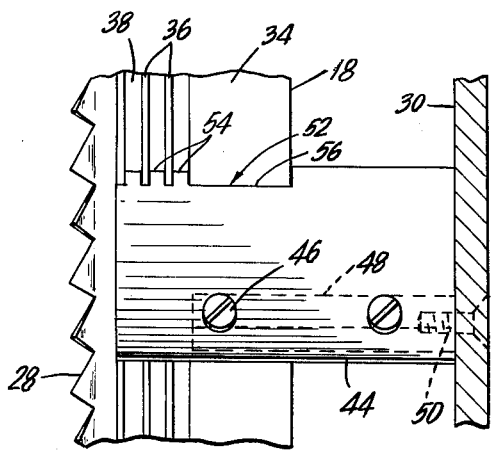
FIG. 3 is a vertical sectional view taken on line 3—3 of FIG. 2.
Figure 4:
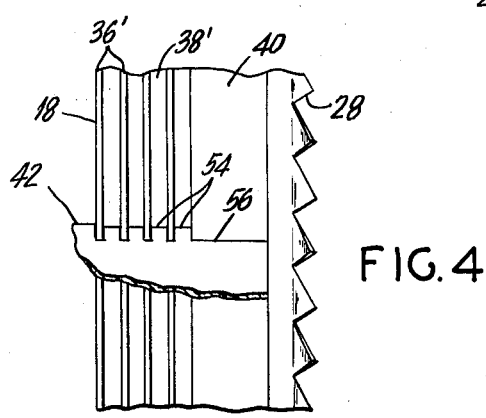
FIG. 4 is a vertical sectional view taken on line 4—4 of FIG. 2.

Associated with the saw blade is a pair of scraper blades 42 and 44 positioned at opposite sides of the saw blade and having parts in sliding contact with the sides of the saw blade to remove fat and bone-dust therefrom during the operation of the band saw. More particularly, each scraper is a relatively thin spring steel member to which is secured, as by screws 46, a support member 48 that is secured to the wall 30 of the band saw housing by a screw 50. Each scraper blade has an edge 52 in contact with the companion side of the saw blade and each edge has formed therein a series of rectangular shaped, laterally spaced teeth 54 which extend into the corresponding grooves 38 and 38' in sliding contacts with the surfaces forming said grooves to remove the collected fat and bone dust. Edge 52 is also provided with a groove 56 which is in sliding contact with the corresponding flat portion of the side of the saw blade. It is to be noted, as best seen in FIGS. 3 and 4, that the scraper blades are similar with the number of teeth 54 and their positions as well as the positions of grooves 56 differing to correspond with the grooves 38 and 38' and the flat portion of the companion side of the saw blade.

While I have shown and described the preferred embodiment of the invention, it will be understood that the invention may be embodied otherwise than as herein specifically shown and described and that other embodiments of the invention may be provided within the principles and ideas underlying the invention within the scope of the appended claims.

I claim:

1. In combination, an endless flexible band having an edge provided with saw teeth and a pair of opposite sides each having a plurality of longitudinally extending parallel grooves, and scraper means positioned at each side of said blade, said scraper means having a plurality of teeth projecting into the companion grooves in sliding contact with the surfaces forming said grooves.

2. The combination of claim 1, said scraper means comprising a relatively thin spring member.

3. The combination of claim 1, wherein the grooves of one side of said blade are offset from said grooves of the opposite side of said blade, and said scraper means comprises a pair of scraper blades each having laterally spaced teeth projecting into the companion grooves of said saw blade, the teeth of one of said scraper blades being offset from the teeth of the other of said scraper blades.

4. The combination of claim 3, the remaining portions of each side of said blade being flat, the flat portion of one side of said blade being offset from the flat portion of the opposite side of said blade, and each of said scraper blades having a groove, said flat portions of said saw blade projecting into the companion groove of the companion scraper blade in sliding contact therewith, said groove of one scraper blade being offset from the groove of the other scraper blade.

5. The combination of claim 4, the grooved portion of one side of said band saw blade being opposite the flat portion of the other side of said band saw blade, and the grooved portion of said other side of said band saw blade being opposite the flat portion of said one side of said band saw blade, and the groove of one scraper blade being opposite the teeth of the other scraper blade.

6. A band saw blade comprising an endless flexible band having a front wall provided with saw teeth, a front intermediate wall joined to the rear end of said front wall and disposed perpendicularly to said front wall, a front side wall having its front end joined to one end of said front intermediate wall, a center intermediate wall having one end joined to the rear end of said front side wall, a rear side wall having its front end joined to the other end of said center intermediate wall, said rear side wall being offset parallel to said front side wall, a rear intermediate wall joined to the rear end of said rear side wall, said front, center and rear intermediate walls being of substantially equal width and disposed in aligned, parallel relationship, and the thickness of all of said walls being substantially equal and less than the width of each of said intermediate walls, in combination with a pair of scraper blades disposed one at each side of said band, each of said blades having portions projecting into the spaces between said intermediate walls and said side walls, and portions contacting said side walls, whereby said scraper blades contact all surfaces of said side walls and said intermediate walls, said scraper blades being inclined inwardly and upwardly toward said band in a direction opposite to the direction of movement of said band.

7. A bandsaw blade comprising an endless flexible band having a front wall provided with saw teeth, a front intermediate wall joined to the rear end of said front wall and disposed perpendicularly to said front wall, a front side wall having its front end joined to one end of said front intermediate wall, a center intermediate wall having one end joined to the rear end of said front side wall, a rear side wall having its front end joined to the other end of said center intermediate wall, said rear side wall being offset parallel to said front side wall, a rear intermediate wall joined to the rear end of said rear side wall, said front, center and rear intermediate walls being of substantially equal width and disposed in aligned, parallel relationship, and the thickness of all of said walls being substantially equal and less than the width of each of said intermediate walls, the free edge of said front intermediate wall lying in the plane of the outer surface of said rear side wall, the free edge of said rear intermediate wall lying in the plane of the outer surface of said front side wall, a front flange extending from said front side wall parallel to said front intermediate wall and having its free edge lying in the plane of the outer surface of said rear side wall, and a rear flange extending from said rear side wall parallel to said rear intermediate wall and having its free edge lying in the plane of the outer surface of said front side wall, in combination with a pair of scraper blades disposed one at each side of said band, each of said blades having portions projecting into the spaces between said intermediate walls, said flanges and said side walls, and portions contacting said side walls, whereby said scraper blades contact all surfaces of said flanges, said side walls and said intermediate walls, said scraper blades being inclined inwardly and upwardly toward said band in a direction opposite to the direction of movement of said band.

8. A band saw blade comprising an endless flexible band having saw teeth at one longitudinal edge and being formed at each of opposite sides thereof with an endless groove, said grooves being offset from one another, and said band having at each side, a longitudinal flat portion, said flat portions being offset from one another, and scraper blades at opposite sides of said band, included thereto and each having an edge contacting one side of the band and a companion tooth projecting into the groove on said one side of said band.

References Cited by the Examiner

UNITED STATES PATENTS 2,864,411   12/58   Stringfellow _____ 143—158

FOREIGN PATENTS 69,436   7/41   Czechoslovakia.
48,786   9/89   Germany.
320,042   4/57   Switzerland.

WILLIAM W. DYER, JR., *Primary Examiner.*

DONALD R. SCHRAN, *Examiner.*